United States Patent
Geoffrey

(10) Patent No.: US 9,992,026 B2
(45) Date of Patent: Jun. 5, 2018

(54) ELECTRONIC BIOMETRIC (DYNAMIC) SIGNATURE REFERENCES ENROLLMENT METHOD

(71) Applicant: Mohammed Alawi E Geoffrey, Jeddah (SA)

(72) Inventor: Mohammed Alawi E Geoffrey, Jeddah (SA)

( * ) Notice: Subject to any disclaimer, the term of this patent is extended or adjusted under 35 U.S.C. 154(b) by 0 days. days.

(21) Appl. No.: 14/670,873

(22) Filed: Mar. 27, 2015

(65) Prior Publication Data

US 2015/0280921 A1    Oct. 1, 2015

Related U.S. Application Data

(60) Provisional application No. 61/971,830, filed on Mar. 28, 2014.

(51) Int. Cl.
| | |
|---|---|
| *H04L 9/32* | (2006.01) |
| *H04L 9/08* | (2006.01) |
| *G06F 21/32* | (2013.01) |
| *H04L 9/14* | (2006.01) |

(52) U.S. Cl.
CPC ............ *H04L 9/3247* (2013.01); *G06F 21/32* (2013.01); *H04L 9/0866* (2013.01); *H04L 9/14* (2013.01); *H04L 2209/24* (2013.01); *H04L 2209/72* (2013.01)

(58) Field of Classification Search
CPC ....... H04L 9/3247; H04L 9/14; H04L 9/0866; H04L 2209/24; H04L 2209/72
See application file for complete search history.

(56) References Cited

U.S. PATENT DOCUMENTS

| | | | |
|---|---|---|---|
| 6,381,695 B2* | 4/2002 | Kudo et al. ............ | H04L 9/321 380/279 |
| 6,745,327 B1 | 6/2004 | Messing | |
| 7,024,562 B1* | 4/2006 | Flink et al. ........... | H04L 9/3231 713/176 |
| 7,305,558 B1* | 12/2007 | Miyazaki et al. ...... | H04L 9/321 713/178 |
| 8,583,915 B1* | 11/2013 | Huang ................ | H04L 63/0869 713/155 |
| 2002/0010857 A1 | 1/2002 | Karthik | |
| 2003/0179912 A1 | 9/2003 | Murase et al. | |

(Continued)

OTHER PUBLICATIONS

Extended European Search Report issued by the European Patent Office for Application No. 15161459.1 dated Jun. 29, 2015.

*Primary Examiner* — Mohammad A Siddiqi
(74) *Attorney, Agent, or Firm* — Pearl Cohen Zedek Latzer Baratz LLP

(57) ABSTRACT

A system or method for enrolling a signature may include transmitting a user's public key and a time stamp to a client device. The method may further include receiving an encrypted time stamp and encrypted signature data associated with the user, wherein the signature data is encrypted using the user's public key. The encrypted time stamp may be decrypted using the user's private key, and the received encrypted signature data may be validated based on the decrypted time stamp. If the received encrypted signature data is determined to be valid, the encrypted signature data may be stored and digitally signed with the user's private key. The encrypted signature data may be further digitally certified with an administrator's private key.

19 Claims, 4 Drawing Sheets

(56) References Cited

U.S. PATENT DOCUMENTS

| | | | |
|---|---|---|---|
| 2005/0229007 A1 | 10/2005 | Bolle et al. | |
| 2007/0016788 A1* | 1/2007 | Kakehi | H04L 9/3236 713/176 |
| 2009/0119399 A1* | 5/2009 | Hussain et al. | G06F 17/30958 709/224 |
| 2010/0255813 A1* | 10/2010 | Belrose et al. | H04L 63/0853 455/411 |
| 2011/0126022 A1* | 5/2011 | Sieberer | H04L 9/0825 713/180 |
| 2012/0087493 A1* | 4/2012 | Chidambaram et al. | H04L 9/0841 380/44 |
| 2012/0089841 A1* | 4/2012 | Boyer et al. | G06F 21/64 713/175 |
| 2012/0117385 A1* | 5/2012 | Bryson | H04L 9/3297 713/168 |
| 2015/0094599 A1* | 4/2015 | Kim et al. | G02B 15/00 600/476 |

* cited by examiner

ELECTRONIC BIOMETRIC (DYNAMIC) SIGNATURE REFERENCES ENROLLMENT METHOD

CROSS REFERENCE TO RELATED APPLICATIONS

The present application claims benefit from prior provisional application Ser. No. 61/971,830 filed on Mar. 28, 2014 and entitled "ELECTRONIC BIOMETRIC (DYNAMIC) SIGNATURE REFERENCES ENROLLMENT METHOD" which is incorporated in its entirety herein by reference.

FIELD OF THE PRESENT INVENTION

Embodiments of the present invention relate to document security and authentication of signatures.

BACKGROUND

Electronic documents or contracts may be signed by users by affixing or adding a user's biometric signature data to the electronic document. Such biometric signature data, if not secure, may be copied by other users who wish to impersonate the signor. In other cases, a user who affixed their biometric signature data to a document may be able to repudiate a signature or deny that the document was actually signed by the user. To verify a biometric signature captured by an electronic pen and a digitized pad, for example, an enrollment administrator may need to initially enroll user signature data as signature references to a separate storage device or server. A user's signature data that is later applied to a document may be compared to the stored signature references in order to confirm that the signature data on the document is associated with the user. When applied to a document or stored on a server, signature data may be encrypted and decrypted by one or more keys unique to the user, ensuring that others are unable to forge the signature data and impersonate the user.

Enrollment data may still be at a risk for tampering, deletion, or repudiation while it is stored and during transfer from original storage to an electronic document. The problem may depend on who maintains control over the signature references. If the user has complete control over enrollment data, then the user can delete or modify the signature references they previously enrolled. The user can also repudiate a document actually signed by the user by claiming that the key or password to decrypt the signature data is lost or forgotten. If an administrator has complete control, the user may be able to repudiate signature data by claiming that the administrator changed the enrollment data.

SUMMARY

A system or method for enrolling a signature may include transmitting a user's public key and a time stamp to a client device. The method may further include receiving an encrypted time stamp and encrypted signature data associated with the user, wherein the signature data is encrypted using the user's public key. The encrypted time stamp may be decrypted using the user's private key, and the received encrypted signature data may be validated based on the decrypted time stamp. If the received encrypted signature data is determined to be valid, the encrypted signature data may be stored and digitally signed with the user's private key. The encrypted signature data may be further digitally certified with an administrator's private key.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
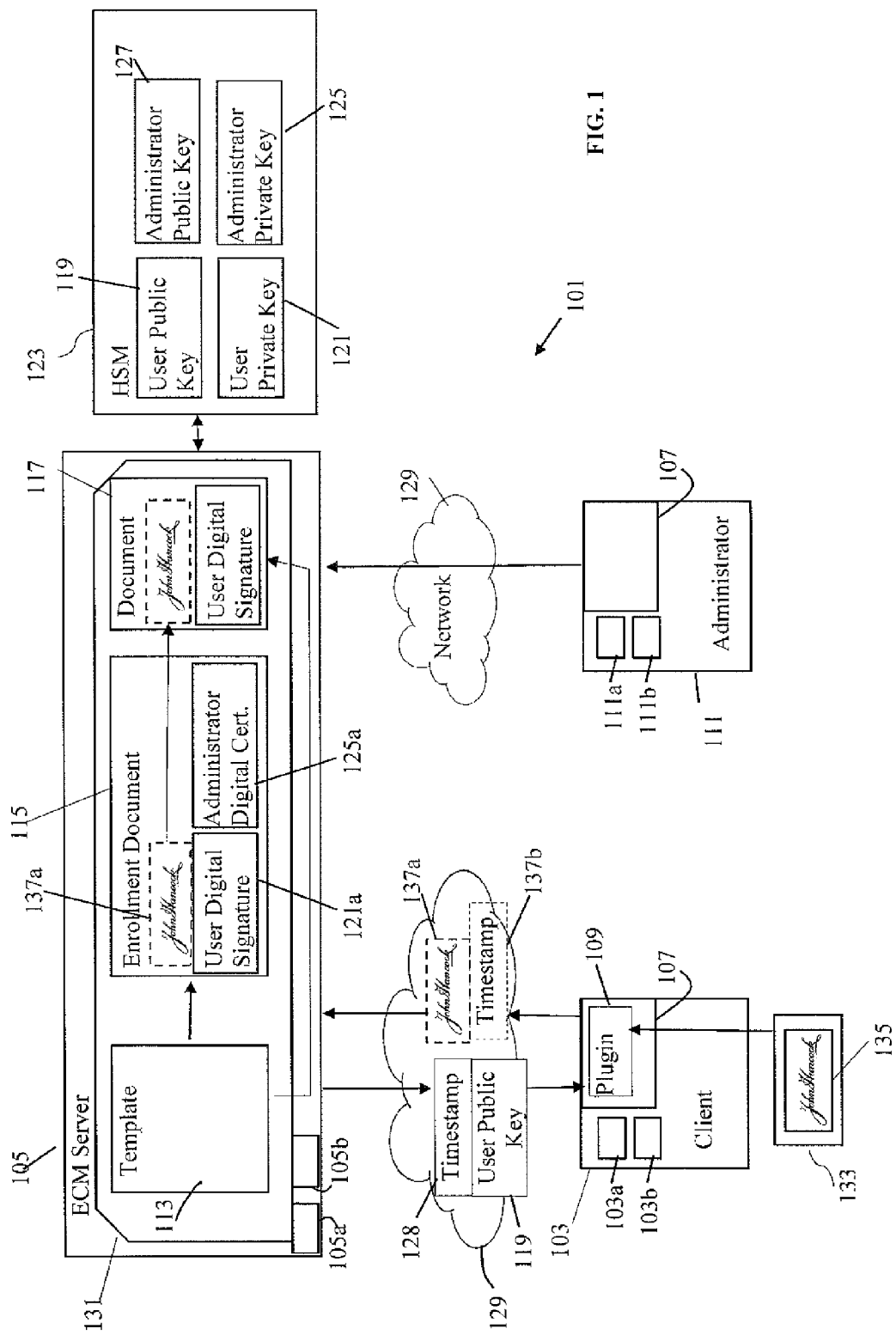
FIG. 1 is a diagram of a system for enrolling a signature, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The term "computer" or "computing device" may be a personal computer, a desktop computer, a mobile computer, a laptop computer, a set-top box, a notebook computer, a workstation, a server computer, a tablet computer, a network appliance, personal digital assistant (PDA), mobile phone, or any other suitable computing device. Typically, a computer includes or is operatively connected to means for connecting the computer to another computer via a network, for example, the Internet.

It should be appreciated that according to some embodiments of the present invention, operations described below may be implemented as machine-executable instructions. These instructions may be used to cause a general-purpose or special-purpose processor using associated software modules programmed with the instructions to perform the operations described. Alternatively, the operations may be performed by specific hardware that may contain hardwired logic for performing the operations, or by any combination of programmed computer components and custom hardware components.

Unless explicitly stated, the method embodiments described herein are not constrained to a particular order or sequence. Additionally, some of the described method embodiments or elements thereof can occur or be performed at the same point in time.

Embodiments of the invention may provide a method or system for securely enrolling signature data identifying a user or organization. The method may allow users to apply their secure and authenticated biometric data on documents, for example. Enrollment may be a process for designating one or more signatures or biometric signatures to be uniquely identified or associated with a user or organization. The biometric signature may be any characteristic that uniquely identifies a person or individual, such as a retina scan, fingerprint, DNA, or handwritten signature of the user's name, voice pattern or other individualized marker. The biometric signature may be represented by biometric data as known in the art, based on the type of biometric signature used. For example, data for a handwritten signature may be represented as an image, or as data describing stroke velocity, stroke pressure, and pen position as x- and y-coordinates. Data for a fingerprint signature may be represented as an image or data describing common fingerprint patterns include the tented arch, the plain arch, and the central pocket loop. Other kinds of data may be used. A signature may also be an organization seal that is used to represent an organizational or corporate entity on a document. The organization seal may be in any format, including png (Portable Network Graphics), jpeg (Joint Photographic Experts Group), pdf (Portable Document Format), or other formats.

Users enrolling their signature or signature data, including organization seals, may include individuals who enter into contracts or other legal documents for which a signature or other identification is required. Users who affix organization seals to documents may be corporate representatives or anyone authorized to represent an organization in a transaction.

The system or method for securely enrolling a signature may store the authenticated signature with two or more indicators that allow organizations or third parties to identify or verify that the source of the authenticated signature is a particular user or person. The indicators stored with the authenticated signature may further allow organizations or third parties receiving users' signatures to ensure that users are unable to repudiate signatures once a document is digitally signed with the authenticated user signature. Each authenticated signature data, for example, is encrypted by a user's public key and digitally signed with a user's private key then digitally signed or certified with an administrator's private key.

To use the enrollment system, each user may have a unique set keys including a public key and a private key. The user's public key and private key may be maintained according to a public key infrastructure (PKI) as known in the art, where a public key is bound and registered with a particular user. The public key's association or registration with a user may be published by a registration authority, for example, and the user may distribute the public key to contracting parties or other third parties overseeing the verification of a digitally signed document. In some embodiments of the invention, the public key may be securely stored and transmitted to the user when the enrollment process begins, while the user's private key remains permanently stored and never distributed. The user may further use their public key in order to enroll their signature in a central electronic content management server or repository, as described further herein.

The user's private key may be associated with the public key through a mathematical relationship as known in the art of cryptography. Documents, files, or data encrypted by a user's public key may be decrypted by a user's private key; conversely, data encrypted by a user's private key may be decrypted by the user's public key. According to embodiments of the invention, the user's private key may be stored in a secure memory or hardware module along with a digital certificate or algorithm that describes the relationship between the user's public key and private key. The user's private key may be stored so that it cannot be distributed or published, and cannot be utilized by anyone other than the user.

A system for enrolling a user's signature may involve a central server for storing enrolled signatures and providing authenticated signatures when requested by the appropriate user (e.g., a user providing authentication of a username and password, for example). The central server may be maintained by a service or an organization for authenticated signatures running on an electronic content management system (ECM) web application connected to Internet or Intranet. An administrator for the organization or service may manage the process of enrolling the signatures and provide additional endorsement of the user signature's veracity. The administrator may generate a public key and a private key for users and store them in a secure hardware security module (HSM). To approve and endorse signatures or seal data enrolled by a user, the administrator may certify the document containing the signatures or seal data by digitally signing the document with the administrator's private key. The administrator may then tag the document as read-only so that neither the user, administrator, nor anyone else can revise or modify the document or the signature data contained in the document. Tagging may involve changing the read and write permissions on the document, for example.

FIG. 1 is a diagram of a system 101 for enrolling a signature, according to embodiments of the invention. Steps for enrolling an authenticated signature from a user may occur between an electric content management system (ECM) server 105 and a client device 103. A user or individual may use an Internet browser 107 on client device 103 or administrator device 111 in order to access the ECM web server 105. Each step or action during enrollment may be implemented by computer programs or software on the client device 103 or ECM server 105. The software or computer programs described (e.g., browsers, browser plugins, or other routines) may be implemented by processor 103a on the client device 103 and processor 105a on ECM server 105. On the client device 103 and administrator device 111, software used to connect with the ECM server 105 may be a browser plugin 109, for example. Memory or storage device 103b on client device 103 and memory 105b may store data or software. Similarly, an administrator device 111 may include processor 111a and memory 111b in order to store and execute software and instructions described herein. Both the administrator device 111 and client device 103 may be any kind of computing device, including a laptop, desktop computer, smart phone or tablet, for example. In some embodiments an application stored on a computer or smart phone may be used to communicate with and access the ECM server 105.

Each user enrolling a signature may be provided with or assigned a unique set of keys or passwords, a user public key 119 and a user private key 121 that is securely stored in a hardware secure module (HSM) 123. When a user creates an account with ECM server 105, the user may be required to set up a username and one or more passwords. Preferably, a two-factor or multi-factor authentication system is used to identify each user and allow the user to use their assigned public key 119 and private key 121. For example, in two-factor authentication, the user may be required to enter a username and a known first password to ECM server 105, and the user may be required to enter a second password or a pin that comes from a device that only the user possesses (such as a random number generated by mobile device or keychain). Similarly, an administrator may also authenticate themselves with the ECM server 105 using two-factor authentication. This allows the administrator to securely use public and private keys assigned or registered to the administrator.

The HSM 123 may be accessible by the ECM server 105, but may not be directly accessible by a network or other Internet connection. HSM 123 may be a hard drive, USB key, secure digital card, or other kind of storage device that is coupled with the ECM server 105. The administrator's private key 125 and public key 127 may also be stored in the HSM. Other data relating to the keys may be stored in the HSM, such as digital certificates that link the private keys 121 and 125 with the public keys 119 and 127. The HSM may also store public keys 119 and 127 but this may be optional since the public keys may be derived from the private keys through a mathematical or algorithmic relationship. When the user wishes to enroll a signature with ECM server 105, the user may identify themselves with a username and one or more passwords and the ECM server will retrieve the public keys associated with the user's account.

Client device 103 and administrator device 111 may remotely access ECM server 105 through the web, Internet 129, public network, or private network. Alternatively, client device 103 and administrator device 111 may directly connect to ECM server 105 through a direct wired connection (e.g., at a bank kiosk, where a user and administrator may connect to the ECM server located at the bank).

Prior to enrolling signature data, the administrator may upload a signature template document 113 to a private or secure folder 131 that is accessible only by the user and the administrator. The signature template 113 may be a blank document with fields that require one or more signatures before being stored or saved as an official enrollment document 115.

When a user initiates the enrollment process (by sending a request for initiation to the ECM server 105, for example), ECM server 105 may retrieve the user's public key 119 from HSM 123 and generate a current time stamp 128. The time stamp 128 may be a serial number that describes a time of day in milliseconds, for example. ECM server 105 may first transmit the user's public key 119 and time stamp 128 to the client device 103, and then call the user's browser plugin program 109 to request a user's signature data. Client device 103 may be connected to or may be integrated with a device 133 for capturing biometric signature data 135, including a handwritten signature as shown, fingerprint data, or iris or retina scanning data. Other kinds of biometric signature data may be used. Browser plugin 109 (or other software on the client device 103) may receive the signature data 135 generated by and associated with the user, via capture device 133.

Client device 103 may then encrypt both the signature data 135 and the timestamp 128 with the user's public key 119 received from ECM server 105. In some embodiments, the signature data 135 may be encrypted first and the time stamp linked to the encrypted signature data 135 next. The encrypted signature data 135 and linked time stamp may together be encrypted with the user public key 119. In other embodiments, the signature data 135 may first be linked with the received time stamp 128 and then encrypted by the client device 103. In yet other embodiments, the client device may separately encrypt the signature data 135 and received time stamp 128 and transmit them in one data packet.

The plugin 109 on client device 103 may transmit the encrypted signature data 137a and encrypted time stamp 137b to the ECM server 105. When the ECM server 105 receives the encrypted signature data 137a and encrypted time stamp 137b, the ECM server may validate the received encrypted signature data 137a based on the encrypted time stamp 137b. First, after ensuring that two-factor authentication by the user has been performed successfully, the ECM server 105 may decrypt the encrypted time stamp 137b using the user's private key 121 from the HSM 123. Since the public key and private key relationship is commutative, the decryption of the encrypted time stamp 137b should yield the same time stamp that was initially transmitted to client device 103 (e.g., timestamp 128). ECM server 105 may compare the transmitted timestamp 128 and the decryption of the encrypted time stamp 137b to determine whether the two values are equal or the same. Further, the ECM server 105 may require that the time stamp is within a time frame of a current or updated time stamp. This time frame may be, for example, a few seconds or a few minutes. The time frame allows time to pass between the initial transmission of the time stamp 128 and the encryption of signature data 135 by the client device 103. The time frame may also ensure that there were no intermediary attacks on the system, e.g., there were no intervening hackers or parties attempting to intercept the signature data, modify the data, and then transmit false signature data to the ECM server 105. If intervening hackers modified or tampered with the signature data 135, the encrypted signature data 137a may arrive at ECM server 105 at a time much later than the initially transmitted time stamp 128 (e.g., after a pre-set time frame). Other ways of validating or verifying the signature data based on the encrypted time stamp 137b may be possible.

If the encrypted time stamp 137b is determined to be valid according to the steps described above, the encrypted signature data 137a may be stored in ECM server 105. The encrypted signature data 137a may be stored as a standalone file, or may typically be stored by adding it to the template document 113, for example. Optionally, the signature data may be further validated by requesting more sets of signature data from the user. For example, the ECM server 105 may request three or more hand written signatures from the user, or two or more fingerprint scans. If the plurality of sets of signature data are homogenous or substantially similar enough, then the signature data may be deemed validated. If the plurality of sets of signature data are too dissimilar or different, all the signature data received for the session may be deleted, or the ECM server may request further sets or samples of signature data. After the first set of encrypted signature data is stored to a template document 113, each subsequent set of encrypted signature data that the ECM server 105 requests from the user may be decrypted using the user's private key. The ECM server may compare the decrypted data with the stored sets of signature data, and validating the received encrypted signature data based whether the decrypted data is similar to the one or more stored sets of signature data. For comparison purposes, the stored sets of signature data may be in decrypted form.

Once one or more sets of signature data 135 are determined to be valid or verified, the document or file that includes the encrypted signature is digitally signed with the user's private key 121. The ECM server 105 may automatically sign the document with the user's private key 121 used from HSM 123 after two-factor authentication of the user has been performed successfully, or the user may instruct the ECM server 105 to do so via client device 103. The use of the user's private key 121 to sign the document may result in the ECM server 105 adding the user's digital signature 121a to the document. The administrator may then approve the signature data by authenticating their identity with ECM server 105 (e.g., via successful two-factor authentication) and certifying the document or file with the administrator's private key 125. The use of the administrator's private key 125 to sign the document may result in the ECM server 105 adding the administrator's digital certification 125a to the document. Once the document includes the encrypted signature data 137a, the user's digital signature 121a, and the administrator's digital certificate 125a, the document may now be deemed an official enrollment document 115 and may be tagged by the administrator or ECM server 105 as read-only, or locked from any further modification. The enrollment document 115 may not be downloaded by the user but stored on the ECM server 105 for later signing other documents and verification of signature data found on other documents.

The process of digitally signing or certifying a file or document with a user or administrator's private key may involve methods as known in the art. For example, the file or document including the encrypted signature data 137a may be hashed to a number or value of fixed size (e.g., a number represented by 32 bits). The hash value may be encrypted with the private key, and the hash value and encrypted hash value may be linked with the file, where the digital signature or certificate is represented as the encrypted hash value. When a party wishes to validate the signed document with a user's identity, the party may decrypt the encrypted hash value with the user's public key. If decryption yields the same value as the hashed value of the file, then the signature data is valid and authenticated as identifying the user. The administrator's private key may be used in the same way. Accordingly, when the enrollment document 115, including encrypted signature data 137a, is digitally signed with the user private key 121, the enrollment document is linked with the user's digital signature 121a. The user's digital signature 121a may be a hash value of the enrollment document or the encrypted signature data 137a that is encrypted by the user's private key 121. Similarly, when the enrollment document 115 is digitally certified with the administrator's private key 125, the enrollment document 115 is linked with the administrator's digital certificate 125a. The administrator's digital certificate 125a may be represented as a hash value of the enrollment document 115 that is encrypted by the administrator's private key 125. The administrator's digital certificate 125a may indicate to others that the enrollment document 115 can no longer be changed and that others may be unable to add their digital signature to the enrollment document 115. Accordingly, after the administrator adds the administrator's digital certificate 125a to enrollment document 115, the administrator may tag the enrollment document 115 as read-only.

After enrollment, a user may wish to add a previously enrolled signature 137a (stored in, e.g., enrollment document 115) to a different document, e.g., content document 117 which may include contractual terms or declarations of ownership, for example. The ECM server 105 may require two-factor authentication to verify that the user has authority to apply the signature contained with enrollment document 115. This may be done, for example, by registering a pin code or password from a computer that only the user possesses and returning permission to the HSM 123 to use the user's private key and stored signature data. The ECM server 105 may further verify that the administrator has approved the enrollment of the signature data 115a by affirming that the administrator's public keys successfully decrypts the encrypted hash code of the enrollment document 115. Once this process is complete, the ECM server may apply the encrypted signature data 137a to the content document and sign the content document 117 with the user's private key 121.

Template document 113, enrollment document 115 and authenticated content document 117 may be created and accessed using any of a number of applications, including for example and without limitation Microsoft Office applications (Word, Excel, Power Point, Outlook, Visio, etc.), Adobe Reader or Acrobat, AutoCAD, SolidWorks, or any other suitable document creation and viewing application. The content of the documents may be images, word processing documents, presentations, spreadsheets, business documents, engineering documents, databases, etc.

Content document 117 may typically be electronic documents and/or digitized representations of tangible objects, such as photographs of articles or printed paper documents. The documents stored on ECM server 105, particularly template document 113 may be received from any input means, including users or administrators typing data into a keyboard associated with administrator or client devices, or by an input means capable of converting physical documents to digitized files by a tangible process, e.g., by scanning physical documents using a scanner.

In some embodiments, after enrollment is complete, the user may wish to add signatures to a content document 117 that identify the user but which are in addition the signature data stored in enrollment document 115. For example, the user may have handwritten signatures enrolled or stored in enrollment document 115, but may wish to add another or different set of handwritten signatures to a content document. The user or administrator may upload an unsigned content document to ECM server 105 in place of a template document and the ECM server 105 may perform enrollment of new signatures using the unsigned content document and steps described herein. During validation, the ECM server 105 may further compare the new set of signature data with the sets of signature data previously stored in enrollment document 115.

While in one embodiment processors 105a, 103a and 111a are described as performing certain functionality, in other embodiments, multiple, distributed or different processors, or processors having different structures, may be used. Modules and systems described herein, such as a secure hardware module, a system for enrolling signatures, and other modules, may be or may have their functionality performed by processor 105a, 103a, and 111a. Processor(s) 105a, 103a, and 111a may include one or more processors (of the same or different type) may be part of a larger computing system 101, e.g., a system that analyzes and verifies signatures from users. Processors 105*a*, 103, and 111*a* may be configured to perform embodiments or steps described herein for example by executing software or encoded instructions. Dedicated processors (e.g., video or graphics chips) or dedicated processor areas may be used or may be included as part of processor(s) 105, and such processors may be configured to perform such tasks for example by dedicated circuitry or by executing software. Server 105, client device 103, and administrator device 111 may also be configured to perform steps described herein by including processors within those devices or by executing software or encoded instructions. Memory, such as memory 105*b*, 103*b*, and 111*b*, may be configured to store data used as discussed herein such as images for comparison or analysis, such as reference images and video images, by storing them in hard drives, random access memory, or databases for example. Memory 105*b*, 103*b*, and 111*b* may be configured to store executable software or encoded instructions that are accessible by processor 105*a*, 103*a*, 111*a* or other processors.

Figure 2:
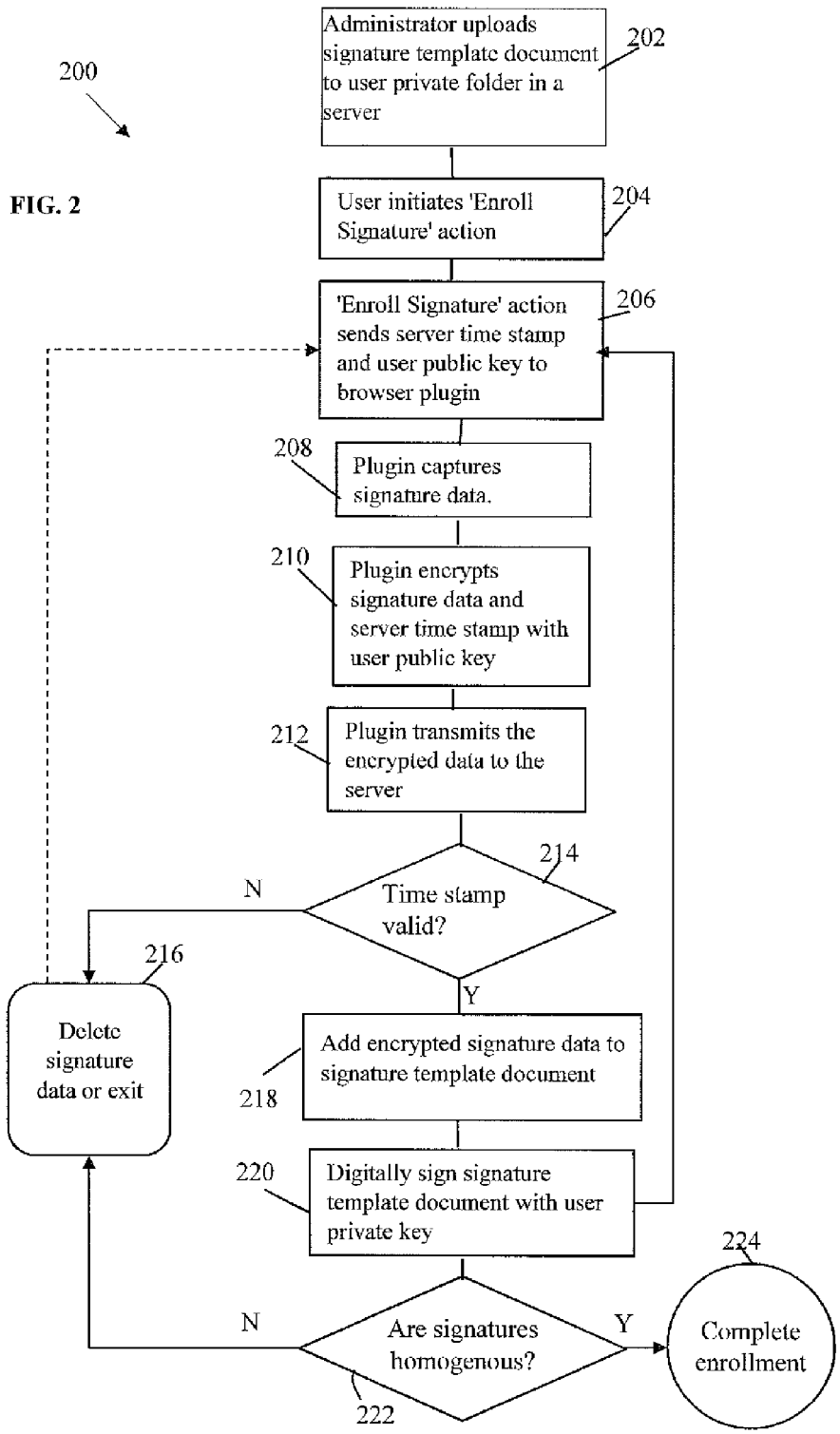
FIG. 2 is a flowchart of a method for enrolling and verifying a signature, according to embodiments of the invention.

FIG. 2 is a flowchart 200 of a method for enrolling and verifying a signature, according to embodiments of the invention. In operation 202, an administrator may initially upload a signature template document to a private folder on a server. As described above, the server may be an electronic content manager. The private folder may be accessible or accessed only by the user and an administrator. A username or password combination may be used to prevent other users from accessing the private folder. In operation 204, a user may initiate or request an "enroll signature" action from a client device, for example. The request may be sent to the ECM server, which begins a computer program on the ECM server. The computer program may send the server's time stamp and user public key to the user's browser plugin on the client device in operation 206. In operation 208, the user's plugin or other software may capture the user's signature data from a capturing device, such as a fingerprint reader or electronic signature pad, for example. In operation 210, the plugin may encrypt the received signature data and server time stamp with the user public key. The plugin transmits the encrypted data to the server in operation 212.

The ECM server may determine whether the encrypted data received from the plugin is valid at operation 214. The verification of the encrypted data may be based on, for example, whether the time stamp is valid. A user private key may be retrieved by the ECM server and used to decrypt the received encrypted data (which includes the signature data and the server time stamp. If the decrypted server time stamp is the same as the initial server time stamp transmitted to the plugin at operation 206, then the signature data may determined to be valid. In some embodiments, the ECM server may further require that the encrypted server time stamp is within a certain time frame of the current time during validation. This may further ensure that malware or an unauthorized device has not intercepted the signature data and transmitted false signature data to the server. Typically, such malware or hacker individuals may introduce latency to the time between a plugin's transmission of encrypted signature data and the server's receipt of the data.

If the time stamp is determined to be invalid, the signature data or signature template document may be deleted at operation 216, or the computer program at the ECM server and the client device may exit. In some embodiments, the signature data may be deleted while the ECM server requests another set or sets of signature data. After multiple failures or invalidations, the program may quit.

If the time stamp is determined to be valid at operation 218, the encrypted signature data is added to the template signature document. At operation 220, the user digitally signs the signature template document that contains the signature data by, for example, instructing a server to sign the signature template document with the user's private key. In some embodiments, the encrypted signature data itself may be stored in the private folder as, e.g., an image file or parametric data file including x- and y-coordinates and p-pressure level and a time value for each point in a handwritten signature. The user private key may also be embedded with the signature data file itself. Optionally, the enrollment process may request a plurality of signature data sets from the user in order to store a more robust set of identifying data. The plurality of signature data sets may be multiple handwriting or voice samples, for example. After the user private key is embedded with a first signature data set in a signature template document, the enrollment process may be repeated in operations 206 to 218 to enroll more than one signature data sets.

In operation 222, the plurality of signature data sets may be checked for homogeneity, substantial similarity, or a match, depending on the type of signature data set that is required by the enrollment process and uploaded by the user. Since a user's handwriting sample may differ between exact points on each sample, a homogenous set of handwriting samples may not have an exact match of data points, but they may have similar features or handwriting styles that may be extracted from the samples by methods known in the art. For a user that is enrolling an organization seal, for example, the determination of whether the signature data sets are homogenous may require an exact match. If the plurality of signature data sets are determined to be non-homogenous, the signature data sets may be deleted at operation 216. The enrollment process may optionally be restarted at operation 206, or the process may exit. If the signatures are determined to be homogeneous, the enrollment process may be completed at operation 224. Completion may mean that one, some, or all of the signature data sets are stored in an ECM server and embedded with the user private key. The administrator may approve the stored signature data by further embedding the administrator private key in the enrollment document. Further details on administrator approval are further discussed at FIG. 4.

Figure 3:
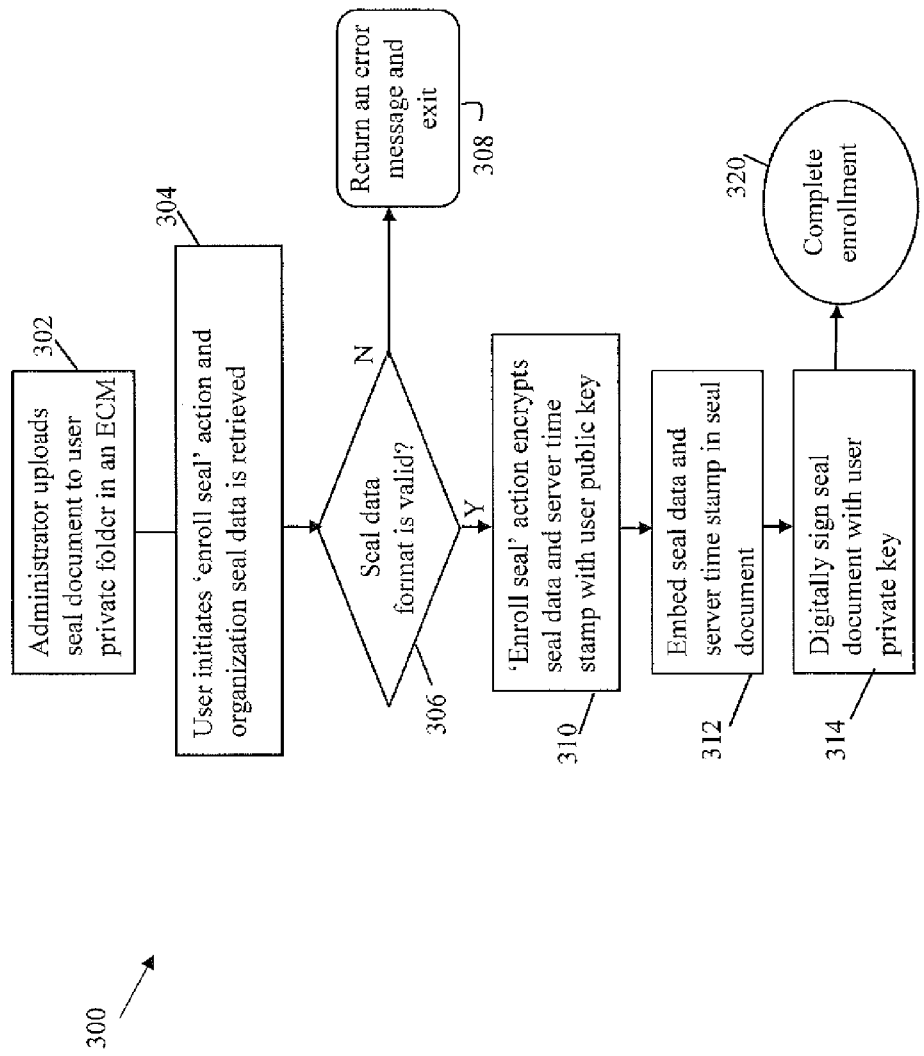
FIG. 3 is a flowchart of a method for enrolling an organization seal, according to embodiments of the invention.

FIG. 3 is a flowchart of a method 300 for enrolling an organization seal, according to embodiments of the invention. Enrolling an organization seal may be similar to enrolling a signature, but the seal data format may have different restrictions for example. At operation 302, an administrator may initially upload a seal document to a private folder in an ECM server (or other server). The private folder may be accessible only to the user and the administrator. The seal document may be similar to a signature template document that includes fields or space for providing an organization or department seal, such as insignias or trademarks that represent an organization or corporation or department in transactions. In some embodiments, the private folder may simply be a blank folder with certain restrictions applied to it so that the private folder only stores organization seals. The seal document may be prepared or created by the administrator to receive only certain formats for a valid seal.

In operation 304, the user may initiate software on a browser plugin to enroll a seal. The user may access a file stored in its client device to retrieve an organization seal. In operation 306, the user's browser plugin may determine whether the seal data format is valid. For example, the browser plugin or the ECM server may have a list of valid file formats that an organization seal may use, such as .png, .jpeg, .tiff, .gif, .pdf or other file formats. If the seal format is determine to be invalid (e.g., the user has uploaded the incorrect file format, such as a .doc file instead of a .jpeg), then in operation 310, the valid seal data and a server time stamp are encrypted with the user's public key.

In operation 312, the encrypted organization seal data and server time stamp is embedded in or added to the seal document that was initially uploaded to the private folder. In operation 314, after two-factor authentication by the user has been performed or verified successfully, the seal document containing the organization seal is digitally signed with the user's private key, stored in a secure hardware module. The administrator may further approve the seal data with an administrator private key, as further described in FIG. 4.

Figure 4:
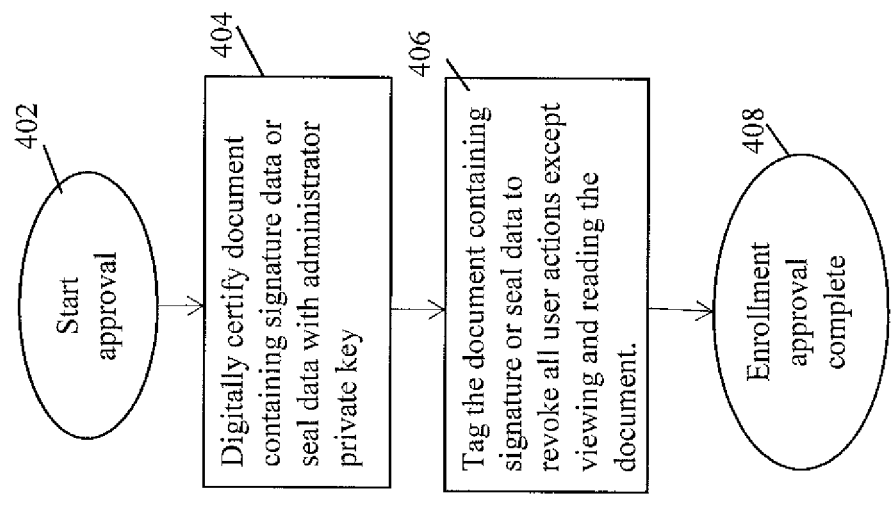
FIG. 4 is a flowchart of a method for approving signature data by an administrator, according to embodiments of the invention.

FIG. 4 is a flowchart of a method 400 for approving signature data by an administrator, according to embodiments of the invention. At operation 402, approving enrolled signature data may start after a signature data is validated, added to a signature template document, and embedded with the user's private key. The user may receive a prompt or notification to proceed to the next step of administrator approval. The user or the user's browser plugin may send a message to the administrator to begin the approval task. At operation 404, after two-factor authentication by the administrator is confirmed, the administrator may certify the document containing the enrolled seal data or signature data with the administrator private key which may be stored in a secure module, such as the HSM (FIG. 1, ref. 123). Certifying with the administrator private key may involve methods as known in the art of digital certification. For example, the document containing the signature data or seal data may be linked to a hash value of the document that is also encrypted with the administrator's private key. The administrator's approval may be confirmed by decrypting the hash value of the enrollment document, encrypted by the administrator with the administrator's public key, and comparing it with the hashed value of the document. If the values are equal, then the administrator's approval is authenticated.

Once the administrator's private key digitally certifies the signature template document (containing the seal or signature data), the document may now be an official enrollment document. In operation 406, the administrator may tag the enrollment document as read-only, for example, which revokes all user permissions on the document, except viewing or reading the enrollment document. This may ensure that the user or other parties cannot modify or tamper with the document or the signature data. The user may not edit, download, copy, move or revert to a previous version of the enrollment document on the ECM server. The administrator may be the only person who can download, copy, move, or revert to previous version, but the administrator may not be able to read the encrypted signature data, because the administrator may not have permission to the access user's private key.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A method for enrolling a signature, comprising:
   transmitting a user public key and a server time stamp to a plugin of a client device;
   receiving from the client device an encrypted server time stamp and encrypted biometric signature data associated with the user, wherein the encrypted server time stamp is encrypted by the plugin of the client device using the user public key and wherein the encrypted biometric signature data is biometric signature data captured by the plugin and encrypted using the user public key;
   decrypting the encrypted server time stamp using a user private key;
   validating the received encrypted biometric signature data based on the decrypted time stamp; and
   if the received encrypted biometric signature data is determined to be valid:
      storing the encrypted biometric signature data;
      digitally signing the encrypted biometric signature data with the user private key;
      digitally certifying the encrypted biometric signature data with an administrator private key, and
      enrolling the biometric signature.

2. The method of claim 1, comprising, if the received encrypted biometric signature data is determined to be invalid, deleting the encrypted biometric signature data.

3. The method of claim 1, comprising:
   decrypting the received encrypted biometric signature data using the user private key;
   comparing the decrypted data with one or more stored sets of signature data; and
   validating the received encrypted biometric signature data based on whether the decrypted data is similar to the one or more stored sets of biometric signature data.

4. The method of claim 1, comprising uploading a signature template document to a secure folder accessible by only the user and the administrator.

5. The method of claim 4, comprising, if the received encrypted biometric signature data is determined to be valid:
   adding the received encrypted biometric signature data to the signature template document;
   digitally signing the signature template document with the user private key; and
   digitally certifying the signature template document with the administrator's private key, thereby storing the signature template document as an enrollment document, wherein the enrollment document is tagged as read-only.

6. The method of claim 1, further comprising:
   receiving an organization seal from the user device, the organization seal encrypted by the plugin using the user public key;
   determining if the organization seal is valid; and
   for a valid organizational seal, uploading the organization seal to a secure folder accessible by only the user and the administrator, wherein the organization seal is signature data.

7. The method of claim 6, comprising, if the organization seal is determined to be valid, storing the organization seal and digitally certifying the organization seal with the administrator's private key, wherein the organization seal is encrypted using the user public key.

8. The method of claim 1, wherein validating the received encrypted biometric signature data comprises comparing the decrypted time stamp with the transmitted time stamp.

9. An apparatus for enrolling a signature, comprising:
a memory; and
a processor configured to:
  transmit a user public key and a time stamp to a plugin of a client device;
  receive from the client device an encrypted server time stamp and encrypted biometric signature data associated with the user, wherein the encrypted server time stamp is encrypted by the plugin of the client device using the user public key and wherein the encrypted biometric signature data is biometric signature data captured by the plugin and encrypted using the user public key;
  decrypt the encrypted server time stamp using a user private key;
  validate the received encrypted signature data based on the decrypted time stamp; and
  if the received encrypted biometric signature data is determined to be valid:
    storing the encrypted biometric signature data;
    digitally sign the encrypted biometric signature data with the user private key;
    digitally certify the encrypted biometric signature data with an administrator private key; and
    enrolling the biometric signature.

10. The apparatus of claim 9, wherein the processor is configured to digitally certify the encrypted biometric signature data with an administrator's private key by:
  digitally signing the encrypted biometric signature data with the administrator private key; and
  tagging the encrypted biometric signature data as read-only.

11. The apparatus of claim 9, wherein the processor is configured to:
  decrypt the received encrypted biometric signature data using the user private key;
  compare the decrypted data with one or more stored sets of biometric signature data; and
  validate the received encrypted biometric signature data based whether the decrypted data is similar to the one or more stored sets of signature data.

12. The apparatus of claim 9, wherein the processor is configured to upload a signature template document to a secure folder accessible by only the user and the administrator.

13. The apparatus of claim 12, wherein, if the encrypted biometric signature data is determined to be valid, the processor is configured to:
  add the received encrypted biometric signature data to the signature template document;
  digitally sign the signature template document with the user private key; and
  digitally certify the signature template document with the administrator private key, thereby storing the signature template document as an enrollment document, wherein the enrollment document is tagged as read-only.

14. The apparatus of claim 12, wherein, the processor is further configured to:
  receive an organization seal from the user device, the organization seal encrypted by the plugin using the user public key;
  determine if the organization seal is valid; and
  for a valid organizational seal, upload the organization seal to a secure folder accessible by only the user and the administrator, wherein the organization seal is signature data.

15. A system, comprising:
a client device configured to receive a set of biometric signature data generated by a user; and
a server configured to:
  transmit the user public key and a server time stamp to a plugin of the client device, wherein the client device is configured to encrypt the received set of biometric signature data and the server time stamp using the transmitted user's public key;
  receive the encrypted set of biometric signature data and encrypted server time stamp from the client device;
  determine whether the encrypted set of biometric signature data is generated by the user, based on the received encrypted server time stamp;
  if the encrypted set of biometric signature data is determined to be generated by the user:
    add the encrypted set of biometric signature data to a document;
    sign the document with the user private key;
    certify the document with an administrator private key, and
    enrolling the biometric signature.

16. The system of claim 15, wherein the server is to determine whether a plurality of sets of biometric signature data are homogenous to each other.

17. The system of claim 15, wherein the server is to determine whether the encrypted set of biometric signature data is generated by the user by:
  decrypting the received encrypted server time stamp using the user private key; and
  comparing the decrypted time stamp with the transmitted time stamp.

18. The system of claim 15, wherein the server is to tag the signed and certified document as read-only.

19. The system of claim 15, wherein the server is further configured to:
  receive an organization seal from the user device, the organization seal encrypted by the plugin using the user public key;
  determine if the organization seal is valid; and
  for a valid organizational seal, upload the organization seal to a secure folder accessible by only the user and the administrator, wherein the organization seal is signature data.

* * * * *